(12) United States Patent
Ireland (10) Patent No.: US 8,870,124 B2
(45) Date of Patent: Oct. 28, 2014

(54) APPLICATION OF ELASTOMERIC VORTEX GENERATORS

(76) Inventor: Peter Ireland, Wenworth Falls (AU)

( * ) Notice: Subject to any disclaimer, the term of this patent is extended or adjusted under 35 U.S.C. 154(b) by 312 days.

(21) Appl. No.: 12/832,966

(22) Filed: Jul. 8, 2010

(65) Prior Publication Data

US 2011/0008174 A1 Jan. 13, 2011

Related U.S. Application Data (60) Provisional application No. 61/224,481, filed on Jul. 10, 2009.

(51) Int. Cl.
*B64C 21/10* (2006.01)
*B64C 23/06* (2006.01)
*B64C 3/14* (2006.01)

(52) U.S. Cl.
CPC ............... *B64C 23/06* (2013.01); *Y02T 50/164* (2013.01); *B64C 23/065* (2013.01); *Y02T 50/12* (2013.01); *Y02T 50/162* (2013.01); *B64C 2003/147* (2013.01)
USPC .................. 244/200.1; 244/199.1; 244/199.2; 244/198; 244/199; 244/130; 416/223 R (58) Field of Classification Search
USPC .......... 244/200.1, 199.1, 199.2, 199.3, 199.4, 244/198, 199, 130, 132; 416/223 R
See application file for complete search history.

(56) References Cited

U.S. PATENT DOCUMENTS

| | | | |
|---|---|---|---|
| 2,440,240 A * | 4/1948 | Antonson | 244/134 A |
| 2,764,373 A * | 9/1956 | McKee et al. | 244/130 |
| 2,800,291 A * | 7/1957 | Stephens | 244/200 |
| 3,153,319 A | 10/1964 | Young | |
| 3,463,418 A * | 8/1969 | Miksch | 244/200.1 |
| 4,354,648 A | 10/1982 | Schenk | |
| 4,455,045 A | 6/1984 | Wheeler | |
| 5,058,837 A | 10/1991 | Wheeler | |
| 5,069,402 A | 12/1991 | Wortman | |
| 5,088,665 A | 2/1992 | Vijgen et al. | |
| 5,156,362 A | 10/1992 | Leon | |
| 5,253,828 A * | 10/1993 | Cox | 244/200.1 |
| 5,265,830 A | 11/1993 | Allen | |

(Continued)

FOREIGN PATENT DOCUMENTS

WO WO2008113350 9/2008

OTHER PUBLICATIONS

International Search Authority, Written Opinion of the ISA and Search Report, International Application PCT/IB2010/001885 for Peter Ireland for Elastomeric Vortex Generator, Mailed Dec. 7, 2010.

*Primary Examiner* — Isam Alsomiri
*Assistant Examiner* — Assres H Woldemaryam
(74) *Attorney, Agent, or Firm* — Nwamu, P.C.; Fidel D. Nwamu (57) ABSTRACT

A method of improving aerodynamic performance of foils by the application of conformal, elastomeric vortex generators. The novel use of elastomers allows the application of various forms of vortex generators to sections that have been problematic from engineering and cost considerations. A novel and efficient vortex generator profile is identified, which develops an additional co rotating vortex at low energy expenditure. The mechanisms allow for the application of transverse vortex generators, or Gurney Flaps/Lift Enhancement Tabs/Divergent Trailing Edges, to propellers, rotorblades, and to wings/flaps/control trailing edges. Cove Tabs are additionally described using an elastomeric transverse vortex generator to achieve performance improvements of a high lift device.

22 Claims, 6 Drawing Sheets

(56) References Cited

U.S. PATENT DOCUMENTS

| | | | |
|---|---|---|---|
| 5,337,978 A * | 8/1994 | Fahrner et al. | 244/134 A |
| 5,598,990 A * | 2/1997 | Farokhi et al. | 244/200.1 |
| 5,803,409 A | 9/1998 | Keefe | |
| 6,276,636 B1 | 8/2001 | Krastel | |
| 6,427,948 B1 * | 8/2002 | Campbell | 244/204.1 |
| 6,491,260 B2 | 12/2002 | Borcher | |
| 6,612,106 B2 | 9/2003 | Balzer | |
| 6,733,240 B2 | 5/2004 | Gliebe | |
| 6,830,436 B2 | 12/2004 | Shibata | |
| 6,899,369 B2 | 5/2005 | Neel | |
| 7,748,958 B2 | 7/2010 | McVeigh | |
| 7,832,689 B2 * | 11/2010 | Prince et al. | 244/200.1 |
| 7,878,457 B2 * | 2/2011 | Narramore | 244/200.1 |
| 7,900,871 B2 * | 3/2011 | Rincker et al. | 244/134 A |
| 7,914,259 B2 | 3/2011 | Godsk | |
| 8,061,986 B2 * | 11/2011 | Xiong | 416/23 |
| 8,083,488 B2 | 12/2011 | Fritz | |
| 8,083,491 B2 * | 12/2011 | Garcillan Rueda et al. | 416/241 A |
| 8,240,616 B2 * | 8/2012 | Miller et al. | 244/204 |
| 2004/0026953 A1 * | 2/2004 | Neel | 296/91 |
| 2004/0037162 A1 * | 2/2004 | Flohr et al. | 366/181.5 |
| 2004/0129838 A1 * | 7/2004 | Lisy et al. | 244/199 |
| 2007/0018056 A1 * | 1/2007 | Narramore | 244/200.1 |
| 2009/0020652 A1 * | 1/2009 | Rincker et al. | 244/204 |
| 2011/0008174 A1 * | 1/2011 | Ireland | 416/223 R |

* cited by examiner

APPLICATION OF ELASTOMERIC VORTEX GENERATORS

RELATED APPLICATIONS

The present application is a continuation-in-part application of U.S. provisional patent application, Ser. No. 61/224,481, filed Oct. 7, 2009, for ELASTOMERIC VORTEX GENERATORS, by Peter S. Ireland, included by reference herein and for which benefit of the priority date is hereby claimed.

Elastomeric Vortex Generator Provisional patent, Ireland P S, of August 2009. (EFS ID 5676629 Application Number 61224481 Confirmation Number 2708 Title Elastomeric Vortex Generator(s) First Named Inventor Peter Stephen Ireland)

FIELD OF THE INVENTION

The present invention relates to improving foil aerodynamics and, more particularly, to improving lift and drag characteristics. It provides novel material and properties to the field of boundary layer modification and separated flow control, and particularly in the use of blade, ramp, Gurney Flap/Lift Enhancing tab or divergent trailing edge vortex generating systems.

BACKGROUND OF THE INVENTION

Performance of a foil or surface in a flow of fluid such as air or water is critical for a system performance, affecting lift, drag and vibration of a system.

The leading section of the foil is usually an area of increasing thickness and results in a thin laminar boundary layer until such point that viscous drag, surface friction or pertuberances causes turbulence to occur in the boundary layer. The turbulent boundary layer has characteristically higher drag than the laminar flow region, however may also have improved stability of flow. The development of an adverse pressure gradient results in separation of the flow from the surface, and a further large increase in drag occurs from this point rearwards. While a foil section may be designed to maintain a large area of laminar boundary layer, practical limitations of manufacture and cleanliness generally preclude widescale laminar boundary layer development.

Noise signature of a blade, or other foil is affected by the vortex development in the wake of the section. Additionally, lift and drag performance can be affected greatly by the use of trailing edge modifiers. In practice, this performance is not attained due to constraints of engineering a suitable mechanism.

Micro Vortex generators, microVG's, are fabricated from a rigid material such as aluminium are used to reenergise boundary layers. Large Eddy Breakup Units, or LEBU's are occasionally used to adjust a boundary layer condition, and are constructed from rigid materials. A drag modifying surface is manufactured by 3M under the tradename "Riblet". This surface is a thin textured film, designed to provide a reenergising of the boundary layer to reduce surface drag. Alternatively, a rigid surface may be deformed by fluting or indentations that act as a form of flow modifier.

To change acoustic signature and/or lift/drag performance, fluting of the trailing edge of a foil or section has been accomplished, and tabs such as lift enhancing tabs or gurney tabs have been applied in experimentation. Fluting has been accomplished on jet engine exhaust systems in current art.

REFERENCES

Abbott, I. H., and von Doenhoff, A. E., Theory of Wing Sections, Dover, New York, 1959, Chap. 8.

Bandyopadhyaya, P., and Head, M. R., "A Unified View of Turbulent Boundary Layer Structure," 6th Biennial Symposium on Turbulence, Rolla, Mo., October 1979.

Barber, T. J., Mounts, J. S., and McCormick, D. C., "Boundary Layer Energization by Means of Optimized Vortex Generators". AIAA Paper No. 93-0445, January 1993.

Bechert, D. W., Meyer, R., and Hage, W., "Drag Reduction of Airfoils with Miniflaps. Can We Learn from Dragonflies?", AIAA Paper 2000-2315, June 2000.

Bieniawski, S., Kroo, I., "Development and Testing of an Experimental Aeroelastic Model with Micro-Trailing Edge Effectors", AIAA 2003-220, January 2003.

Blackwelder, R. F. and Eckelman, H., "Streamwise Vortices Associated with the Bursting Phenomenon", J. Fluid Mech (1979), Vol. 94, part 3, pp. 577-594.

Bloy, A. W., and Durrant, M. T., "Aerodynamic Characteristics of an Aerofoil with Small Trailing-Edge Flaps", Wind Engineering, Vol. 19, No. 3, 1995, pp. 167-172.

Bloy, A. W., Tsioumanis, N., and Mellor, N. T., "Enhanced Aerofoil Performance Using Small Trailing-Edge Flaps", Journal of Aircraft, Vol. 34, No. 4, 1997, pp. 569-571.

Breidenthal, Jr., R. E., and Russell, D. A., "Aerodynamics of Vortex Generators". NASA CR-182511, December 1987.

Bushnell, D. M., Heiner, J. N., (Editors) "Viscous Drag Reduction in Boundary Layers". Progress in Aeronautics and Astronautics. Vol. 123, AIAA, Washington, D. C. 1990

Carrannanto, P. G., Storms, B. L., Ross, J. C., and Cummings, R. M., "Navier-Stokes Analysis of Lift-Enhancing Tabs on Multi-Element Airfoils," AIAA Paper 94-0050, January 1994.

Cavanaugh, M. A., "The Use of Rudder Trailing Edge T-Strips to Improve Dutch Roll Damping", AIAA 2003-5613, 2003.

Cavanaugh, M. A., Robertson, P., Mason, W. H., "Wind Tunnel Test of Gurney Flaps and T-Strips on an NACA 23012 Wing", AIAA 4175 (2007).

Chun, K. B., Sung, H. J., "Control of turbulent separated flow over a backward-facing step by local forcing", Experiments in Fluids 21 1996 417-426

Clark, J. A. and Markland, E., "Vortex Structures in Turbulent Boundary Layers", Aero. Journal, March 1970, pp. 243-244.

Corke, T. C., Guezennec, Y. and Nagib, H. M.; "Modification in Drag of Turbulent Boundary Layers Resulting from Manipulation of Large-Scale Structures", Viscous Drag Reduction, Vol. 72 Progress in Astronautics and Aeronautics (1979), pp. 128-143.

Eaton, J. K., Johnston, J. P., "Turbulent flow reattachment: an experimental study of the flow and structure behind a backward-facing step", Report MD-39 Thermoscience Division, Dept. of Mechanical Eng., Stanford University 1980

Falco, R., "The Production of Turbulence Near a Wall", AIAA Paper No. 80-1356, July 1980.

Gianluca Iaccarino, G., "Predictions of a Turbulent Separated Flow Using Commercial CFD Codes", Center for Turbulence Research, Stanford University, Stanford, Calif., Journal of Fluids Engineering, DECEMBER 2001, Vol. 123 pp 819-828

Giguere, P., Dumas, G., and Lemay, J., "Gurney Flap Scaling for Optimum Lift-to-Drag Ratio", Journal of Aircraft, Vol. 35, No. 12, 1997, pp. 1888-1890.

Grose, R. M., "Theoretical and Experimental Investigation of Various Types of Vortex Generators", United Aircraft Corporation Research Department Report R-15362-5, March 1954.

Tanner, L. H., Pearcey, H. H., and Tracy, C. M., "Vortex Generators; Their Design and Their Effects on Turbulent Boundary Layers", National Physical Laboratory, Preliminary Report, January 1954.

Gould, D. G., "The Use of Vortex Generators to Delay Boundary Layer Separation; Theoretical Discussion Supported by Tests on a CF-100 Aircraft", National Aeronautical Establishment Laboratory Report LR-183, December 1956.

Gadetskiy, V. M., Serebriyskiy, Ya. M., and Fomin, V. M., "Investigation of the Influence of Vortex Generators on Turbulent Boundary Layer Separation", NASA TT F-16, 056, December 1974.

Hastings, E. C.; Faust. G. K.; Mungur. P.; Obara. C. J.; Dodbele. S. S.; Schoenster. J. A.; Jones. M. G. "Status Report on a Natural Laminar Flow Nacelle Flight Experiment", NASA N90-12550, 1990.

Hefner, J. N.; Weinstein, L. M. and Bushnell, D. M., "Large Eddy Breakup Scheme for Turbulent Viscous Drag Reduction", Viscous Drag Reduction, Vol. 72, Progress in Astronautics and Astronautics (1979), pp. 110-127.

Henne, P. A., "Innovation with Computational Aerodynamics: The Divergent Trailing-Edge Airfoil", Applied Computational Aerodynamics, edited by P. A. Henne, Vol. 125, Progress in Aeronautics, AIAA, Washington, D.C., 1990, Chap. 8.

Jang, C. S., Ross, J. C., Cummings, R. M., "Numerical Investigation of an Airfoil with a Gurney Flap", Aircraft Design, Vol. 1, No. 2, June 1998, pp. 75-88.

Jeffrey, D., Zhang, X., and Hurst, D. W., "Aerodynamics of Gurney Flaps on a Single-Element High-Lift Wing", Journal of Aircraft, Vol. 37, No. 2, 2000, pp. 295-301.

Johnson, S. J., van Dam, C. P., and Berg, D. E., "Active Load Control Techniques for Wind Turbines", Sandia National Laboratories Technical Manager Sandia Contract No. 360473. SAND2008-4809 August 2008.

Kane, R. S., in "Viscous drag reduction in boundary layers" (ed. D M Bushnell and. J N Hefner) Progress in Astronautics and Aeronautics 123, p. 433 (1990).

Kentfield, J. A. C., "Theoretically and Experimentally Obtained Performances of Gurney-Flap Equipped Wind Turbines", Wind Engineering, Vol. 18, No. 2, March 1994, pp. 63-74.

Kim J., Kline, S. J., Johnston, J. P., "Investigation of a reattaching turbulent shear layer Flow over a backward-facing step", J Fluids Eng 102:302-308. (1980).

Ladson, C. L., "Effects of Independent Variation of Mach and Reynolds Numbers on the Low-Speed Aerodynamic Characteristics of the NACA0012 Airfoil Section", NASA TM-4074, November 1988.

Launder, B. E., and Spalding, D. B., 1972, "Mathematical Models of Turbulence", Academic Press, London.

LEE, T AND MATEESCU, D., "EXPERIMENTAL AND NUMERICAL INVESTIGATION OF 2-D BACKWARD-FACING STEP FLOW", Journal of Fluids and Structures (1998) 12, 703-716 Article No. fl980166, Department of Mechanical Engineering, McGill University, Montreal, Que&bec, Canada.

Li, Y. C., Wang, J. J., and Zhang, P. F., "Effect of Gurney Flaps on a NACA0012 Airfoil", Flow, Turbulence and Combustion, Vol. 68, No. 1, 2002, pp. 27-39.

Li, Y. C., Wang, J. J., Tan, G. K., and Zhang, P. F., "Effects of Gurney Flaps on the Lift Enhancement of a Cropped Non-slender Delta Wing", Experiments in Fluids, Vol. 32, No. 1, 2002, pp. 99-105.

Li, Y. C., Wang, J. J., Zhang, P. F., "Influences of Mounting Angles and Locations on the Effects of Gurney Flaps", JOURNAL OF AIRCRAFT Vol. 40, No. 3, May-June 2003.

Liebeck, R. H., "Design of Subsonic Airfoils for High Lift," J. Aircraft, Vol. 15, No. 9, September 1978, pp. 547-561.

Lin, J. C., "Control of Turbulent Boundary-Layer Separation using Micro-Vortex Generators", NASA Langley Research Center, Hampton, Va., 30th AIAA Fluid Dynamics Conference, 28 Jun.-1 Jul. 1999, Norfolk, Va.

Lin, J. C., Howard, F. G., and Selby, G. V., "Small Submerged Vortex Generators for Turbulent Flow Separation Control", Journal of Spacecraft, Vol. 27, No. 5, October 1990, pp. 503-507.

Lin, J. C., Robinson, S. K., McGhee, R. J., and Valarezo, W. O., "Separation Control on High Reynolds Number Multi-Element Airfoils", AIAA Paper No. 92-2636, June 1992.

Martuccio, M. T., "A WIND TUNNEL INVESTIGATION OF THE EFFECTS OF MICRO-VORTEX GENERATORS AND GURNEY FLAPS ON THE HIGH LIFT CHARACTERISTICS OF A BUSINESS JET WING", NASA TM-110626 (1994).

Mayda, E. A., van Dam, C. P., Yen-Nakafuji, D. T., "Computational Investigation of Finite Width Microtabs for Aerodynamic Load Control", Department of Mechanical and Aeronautical Engineering University of California, Davis Davis, Calif. 95616 (2005), AIAA 2005-1185.

MIN, T. G., KANG, S. M., SPEYER, J. L., AND KIM, J., "Sustained sub-laminar drag in a fully developed channel flow", J. Fluid Mech. (2006), vol. 558, pp. 309-318.

Mossman, Emmet A.; Randall, Lauros M., "An experimental investigation of the design variables for NACA". naca-rm-a7i30 January, 1948.

Meyer, R., Bechert, D. W., and Hage, W., "Drag Reduction on Gurney Flaps and Diverging Trailing Edges", Notes on Numerical Fluid Mechanics, Vol. 76, Springer-Verlag, Berlin, 2000, pp. 229-245.

Meyer, R., Hage, W., and Bechert, D. W., Schatz, M., and F. Thiele, F., "Drag Reduction on Gurney Flaps by Three-Dimensional Modifications", JOURNAL OF AIRCRAFT Vol. 43, No. 1, January-February 2006

Myose, R., Heron, I., and Papadakis, M., "Effect of Gurney Flaps on a NACA0011 Airfoil", AIAA Paper 96-0059, January 1996.

Myose, R., Papadakis, M., Heron, I., "The Effect of Gurney Flaps on Three-Dimensional Wings with and without Taper", SAE Technical Paper 965514, October 1996.

Myose, R., Papadakis, M., and Heron, I., "Gurney Flap Experiments in Airfoils, Wings, and Reflection Plane Model", Journal of Aircraft, Vol. 35, No. 2, 1998, pp. 206-211.

Neuhart, D. H., and Pendergraft, O. C., "A Water Tunnel Study of Gurney Flap", NASA TM-4071, November 1988.

Powers. S. G.; "Flight-Measured Pressure Characteristics of Aft-Facing Steps in High Reynolds Number Flow at Mach Numbers of 2.20, 2.50, and 2.80 and Comparison With Other Data", Dryden Flight Research Center, Edwards, Calif. NASA Technical Memorandum 72855, May 1978.

Praturi, A. K. and Brodkey, R. S.; "A Stereoscopic Visual Study of Coherent Structures in Turbulent Shear Flow", J. Fluid Mech, (1978), Vol. 89, part 2, 25i-272.3.

Price, J. L., Chokani, N., and Mangalam, S. M., "Unsteady Aerodynamic Simulations of an Oscillating Airfoil with Miniflaps", 40th AIAA Aerospace Sciences and Exhibit 14-17 Jan. 2002 Reno, Nev. AIAA 2002-0118.

Price, J. L., Chokani, N., and Mangalam, S. M., "Unsteady Aerodynamic Measurements using Multi-Element Hot- Film Arrays on an Oscillating Airfoil with Gurney Flaps," AIAA Paper 2001-2466, June 2001.

Price, J. L., "Unsteady Measurements and Computations of an Oscillating Airfoil with Gurney Flaps," MS Thesis, Department of Mechanical and Aerospace Engineering, NC State University, Raleigh N.C., 2001.

Rao, D. M. and Mehrotra, S. C., "Flat Plate Drag Measurements With Vortex Generators in Turbulent Boundary Layer", NASA Contractor report 172125, June 1983.

Ross, J. C., Storms, B. L., and Carrannanto, P. G., "Lift-Enhancing Tabs on Multi-Element Airfoils," AIAA Paper 93-3504, August 1993.

Sandborn, V. A., "Aerondynamic Control of Surface Shear Stress Fluctuations in Turbulent Boundary Layers", CSU No.-CER 80-81-HC-VAS-46, April 1981.

Speziale, C. G., Abid, R., and Anderson, E. C., 1990, "A critical evaluation of two-equation models for near wall turbulence," AIAA Paper 90-1481.

Storms, B. L., and Jang, C. S., "Lift Enhancement of an Airfoil Using a Gurney Flap and Vortex Generators", Journal of Aircraft, Engineering Note, Vol. 31, No. 3, 1994, pp. 542-547.

Bruce L. Storms, B. L., Ross, J. C., "AN EXPERIMENTAL STUDY OF LIFT-ENHANCING TABS ON A TWO-ELEMENT AIRFOIL", AIAA-94-1868-CP pp 489-497

Storms, B. L., and Ross, J. C., "An Experimental Study of Lift-Enhancing Tabs on a Two-Element Airfoil", Journal of Aircraft, Vol. 32, No. 5, 1995, pp. 1072-1078.

Tani, I., Iuchi M., Komoda, H., "Experimental Investigation of Flow Separation Associated with a Step or a Groove", Aeronautical Research Institute, University of Tokyo, Report No. 364, April 1961.

Thiel, M. R., Lesieutre, G. A., Maughmer, M. D., Koopmann, G. H., "Actuation of an Active Gurney Flap for Rotorcraft Application", AIAA 2006-2181, May 2006.

Ting. S. T.; Prakash. M., "Simulation of High Reynolds Number Flow Over a Backward Facing Step Using SPH", CSIRO Australia, Technical Report No: CMIS 05/191 Issue 1 7 Dec. 2005.

Valarezo, W. O., Dominik, C. J., McGhee, R. J., and Goodman, W. L., "High Reynolds Number Configuration Development of a High-Lift Airfoil," AGARD Conference Proceedings 515 "High-Lift System Aerodynamics", Banff, Alberta, Canada, October 1992.

van Dam, C. P., Yen, D. T., and Vijgen, P. M. H. W., "Gurney Flap Experiments on Airfoils and Wings", Journal of Aircraft, Vol. 36, No. 2, 1999, pp. 484-486.

Vijgen, P. M. H. W., van Dam, C. P., Holmes, B. J., and Howard, F., "Wind Tunnel Investigations of Wings with Serrated Sharp Trailing Edges", Low Reynolds Number Aerodynamics, edited by T. J. Mueller, No. 54 in Lecture Notes in Engineering, Springer-Verlag, 1989, pp. 295-313.

Walsh, M. J.; "Turbulent Boundary Layer Drag Reduction Using Riblets", AIAA Paper No. 82-0168, 1982.

B. J. Wendt, B. J., Reichert, B. A., "The Modelling of Symmetric Airfoil Vortex Generators", NASA Contractor Report 198501 AIAA-96-0807 June 1996.

Zahle, F., Sorensen, N. N., and Graham, J. M. R., "Computational study of the Risea B1-24 Wind Turbine Profile fitted with Gurney Flaps", EWEA Special Topic Conference Proceedings, 2004.

Current boundary layer modifiers such as micro VG's and LEBU's are rigid in structure. The material they are made from allows limited flexure of the structure, and will not permit the underlying surface to flex. Where there is substantial structural flexing and the modifier extends over any length, these solutions are unable to be used without affecting the torsional or flexing characteristics of the underlying structure. This can result in serious aeroelastic effects, causing structural failure or damage, and are inherently impacted by any alternating loads, bending or flexing resulting in material fatigue. The micro VG's, and similar current art vortex generators are often characterised as being "micro", however as a percentage of the boundary layer height, they are multiples of the laminar boundary layer height in the region of the forward chord of the blade, whereas conventional design optimisation of micro VG's indicate that their height should be less than the boundary layer and generally of the order of 20% or less of the boundary layer thickness to minimise drag losses, while maintaining effectiveness of developing streamwise vortices.

Structural mass of any addition to a foil must be considered for the tensile loading of the foil, particularly for a blade, and also the location on the blade relative to the chort must be considered: weight added at the trailing edge is potentially adverse to the dynamic stability of the foil (flutter). This may be offset by related aerodynamic effects if those effects move the centre of pressure rearward more than the weight addition shifts the centre of mass of the foil section. Addition of mass to a rotor system increases inertial loading in the feathering axis, pitching axis, and increases radial shear loads. Therefore, minimum mass needs to be achieved at all times.

Fluting of a section involves complex engineering, and can result in structural problems such as material fatigue. Gurney tabs are predominately mechanical devices, and the structure adds weight and additionally affects torsional and bending moments of inertia of a structure. This may cause bond or fastener failure over time through fatigue and incompatibility of the attachment system.

SUMMARY OF THE INVENTION

In accordance with the present invention, there is provided new and enhanced alternatives for the application of vortex generating mechanisms. These mechanisms are fabricated from elastomeric materials, either by extrusions cut to form or by sheet stock cut to beneficial designs.

The use of elastomeric materials in a vortex generating device is counter intuitive, in that the prior art has developed using either rigid formed structures, or air jet systems, and the ability of an elastomeric compound to retain a stabilised form arises from the surprising fact that the vorticity on each side of a blade once established are in the main both stable and both series of vortices support the structure between them, thereby retaining the structure in place when subjected to high velocity newtonian fluid flows. This is valid for blade and tabs such as Gurney Flaps/Lift Enhancement Tabs, which are able to be formed form either an L or T form blade running transversely proximate to the trailing edge of a foil, or surprisingly, as a rectangular extrusion (or machined strip) section of elastomeric material.

The profiles of blade vortex generators additionally are improved by the incorporation of multi bladed sections, which increase the total fluid entrainment in vortices. these are described as F, or U forms with multiple parallel blades being fabricated in section, and the vortex generator being completed by trimming the extrusion to the desired length and lengthwise profile. This arrangement results in an additional central vortice being produced, which is co rotational with the 2 vortices that are produced from a single blade generator, however the total drag is nominally unchanged, as the central vortex efficiently develops in a channel. Testing to date indicates that the vortex generator of multiple blades is effective at developing vortices, however comparative performance is not completed.

The use of elastomeric materials allows the designer new freedom to place a flow modifier such as these items in areas that are either sensitive to mass, such as the trailing edge of an aileron or other surface subject to flutter considerations, and in areas where the existing dynamic flexure and torsion of the structure would preclude safety attaching any additional structure which has different material properties to the substrate. This condition also includes cases where the materials may have been common, but the fabrication results in variation of the bending and torsional properties of the flow modifier and the substrate. A particular case in point is attempting to place a transverse device such as a Gurney Flap or Lift Enhancement Tab to the trailing edge of a helicopter rotor, where the attachment base and tab form an L or T form that increases rigidity in an area subject to cyclical bending loads, which cause spanwise distortion of the blade from a straight span. Such application of current art structure of vortex generators would generate high fatigue loads at the bond, resulting in failure or alternatively transfers high loads to the end sections of a strongly bonded/connected tab to blade, where the structural properties of the section with the tab vary from the section without such reinforcement. In the case of a rotor, additionally the increase in rigidity of the trailing edge by the application of a rigid form of tab results in a change in characteristics between the trailing edge bending and the leading edge behavior to these cyclical loads, and results in torsional variations being introduced.

Gurney Flaps/Lift Enhancement Tabs have been the subject of substantial research, however the primary focus has been on the blade form extending normal to the lower rear surface of the foil. One series of experiments did evaluate alternative rigid forms, including triangular and concave profiles, at relatively low velocities, in the area of high lift capability, and separately current art has described rigid mechanisms of a divergent trailing edge to a foil at high velocities, and low angles of attack, consistent with cruise conditions for subsonic cruise. The flow structure of a trailing edge tab is in the main consistent with the structure of the divergent trailing edge. The efficiency of a low aspect, below 0.5% chord blade form tab located within 2× the tab height of the trailing edge of a foil is beneficial, and affects both low speed performance of lift, angle of attack capability and lift drag ratio, and at high speed can improve lift/drag ratio and additionally increasing the critical drag rise mach number, through lowering of the suction peak. Flight testing indicates that an elastomeric rectangular section bonded to the trailing edge in the manner of a Gurney Flap, acts as both a Gurney Flap, and as a Divergent Trailing Edge device.

testing of an elastomeric Lift Enhancing Tab was conducted on an aircraft propeller, and also a helicopter Main Rotor.

In the case of the propeller, the 1.6 mm high×12 mm wide elastomeric tape of EPDM foam was bonded to the pressure face trailing edge of the left hand engines propeller of the twin engined aircraft, a PA23-250. Spanwise location was varied in testing, however the application of the tape with the tape aft face parallel, and 1.6 mm forward of the trailing edge of the blade in chordwise location, and extending as a continuous tape from 40% span to 85% span resulted in improved performance of the propeller. In comparison to baseline performance, the power settings to achieve equivalent thrust from the engines resulted in a reduction of fuel flow required and manifold pressure of approximately 20%. where equal fuel flows and manifold pressures were used on both engines, the indicated airspeed achieved by the aircraft was increased by approximately 5KIAS, with a notable asymmetry in thrust evident supporting improved performance from the modified propellor. Application of the tape to the tip region, approximately 95% span, resulted in some wear of the leading edge of the outer section of the tape, in sandy environmental conditions.

A limited test of elastomeric Lift Enhancement Tabs was conducted on an R22 helicopter main rotor. Acoustic signature variation was immediately noted, and a reduction in blade vortex interaction was also noted, but not empirically recorded due to testing constraints. The power required to hover was reduced by approximately 15% from baseline, for a 3.0 mm×12 mm×1.0 m tab section located 3.0 mm forward of the lower trailing edge of the blade, in the mid span area, approximately 40-75% span. Of note, the normal low rotor RPM stall occurred at 80% RPM for the baseline (manufacturer guidance value given as 83% for test conditions), whereas with the elastomeric tab, the stall occurred at 68% RPM. In the baseline case, the anti torque demanded to maintain directional control, approaches the control limit, whereas in the elastomeric tab test case, the control authority remaining was greater than baseline, even though the reduced RPM substantially reduces the anti torque force developed at the lower RPM. This finding is consistent with the tab developing lower drag, and increasing lift coefficient. The additional conclusion is that the section of the span with the tab also increases the component of total lift that is produced, and reduces the aerodynamic loading at the tip of the blade, which is consistent with the reduction in blade vortex interaction. A reduction in vibration while passing through translational lift is also consistent with this conclusion. High speed flight was conducted up to manufacturers VNE, but was of a limited nature, however no adverse behavior was noted. Autorotation was not evaluated due to the limited nature of the testing, however, quick stop maneuvers which enter autorotative flow conditions were conducted and were unremarkable.

The application of a tab in the cove of a wing/flap system has been shown by current art to be beneficial to improving flow attachment over the flap upper surface at high flap deflections. The current art uses a transverse blade in this area to achieve the transverse vortex that initiates the rather complex and interesting separated flow structure that results in the continued attachment of the boundary layer to the flap in conditions where normally the boundary layer would have separated. The invention as an elastomeric box or rectangular section has been applied in this area in flight test and acts as a Cove Tab, resulting in fully attached flow over a simple flap at 50 degrees flap deflection, as indicated by tuft testing. Lift and drag performance was as expected for the application of a current art Cove Tab. When combined with a series of elastomeric blade vortex generators on the flap upper leading edge, and a series of elastomeric blade vortex generators in the area of the outer wing leading edge outboard of the flaps, the test aircraft, a PA23-250 which normally stalled at 52KIAS, had a resultant stall of 39KIAS, evaluated by GPS method. The cruise performance of this aircraft was improved by 2KIAS where the elastomeric Cove Tab acted as a flap gap seal in the flap retracted position. Drag in the landing configuration was reduced markedly, and aerodynamic vibration related to flow separation from the flaps was absent. Total fly by noise was diminished from the lower power setting required. It should be noted that Cove tabs are primarily beneficial at high deflections, and at lower deflections may cause a slight reduction in coefficient of lift. In testing, it was found that the performance shift was significant to the extent that the aircraft with full flap deflection on takeoff performed to the same level as the aircrafts baseline performance with ¼ or ½ flap deployment.

It would be advantageous to provide a structure of a vortex generator that does not alter the torsional and bending characteristics of the substrate structure It would also be advantageous to provide a vortex generator in a material that allows for conformal attachment to a surface with simple or complex curvatures.

It would further be advantageous to provide increased vorticity for a given drag value, to minimise the size of a vortex generator.

It is advantageous to provide a structure for a vortex generating device that is tolerant of operational damage, whereby it may be deformed by excessive forces or impacts but revert to the design shape on removal of such disturbances.

It is advantageous to have a low density and mass material for a vortex generator applied at or near the rear of a foil section to minimise adverse aeroelastic dynamics.

BRIEF DESCRIPTION OF THE DRAWINGS

A complete understanding of the present invention may be obtained by reference to the accompanying drawings, when considered in conjunction with the subsequent, detailed description, in which.

For purposes of clarity and brevity, like elements and components will bear the same designations and numbering throughout the Figures.

DESCRIPTION OF THE PREFERRED EMBODIMENT

Figure 1:
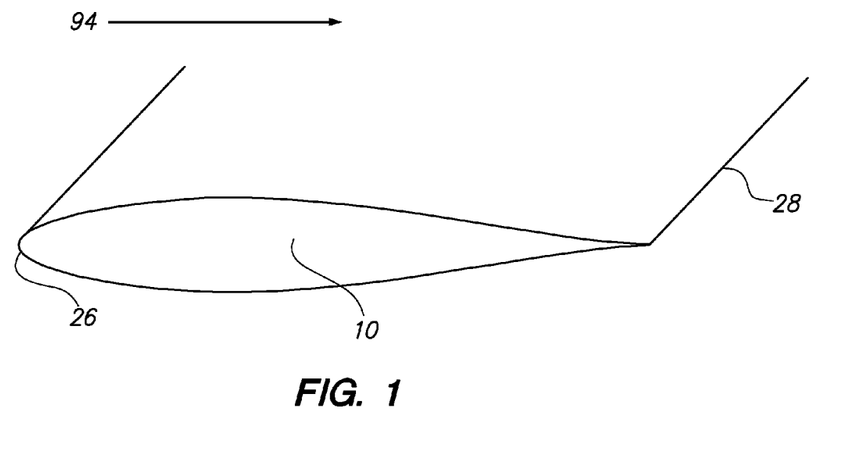
FIG. 1 is a top perspective view of a generic foil.

FIG. 1 is a top perspective view of a generic foil, representation of a foil or aero/hydrodynamic surface 10, showing the general arrangement for the following figures. A foil leading edge 26 is identifiable, as is the foil trailing edge 28. Representative flow directions are shown by annotation with an arrow head, in this case as streamwise flow 94, flowing from left to right in the image. Short streamwise flow 94 or spanwise flow 90 arrows indicate that the flow referred to is on the underside of the image. The arrows for aft face vortice 80, foreward face vortice 78 are indicative only of general flow location, and in the case of a transverse vortex, the direction of the convection of the vortex core is dependent on the incident angle of the streamwise flow 94 and the presence of spanwise flow 90 migration. It is best considered that the rotational flow of the vortex is generally perpendicular to the direction of the vortex arrow, such that the arrow indicates an approximation of the core center.

Figure 2:
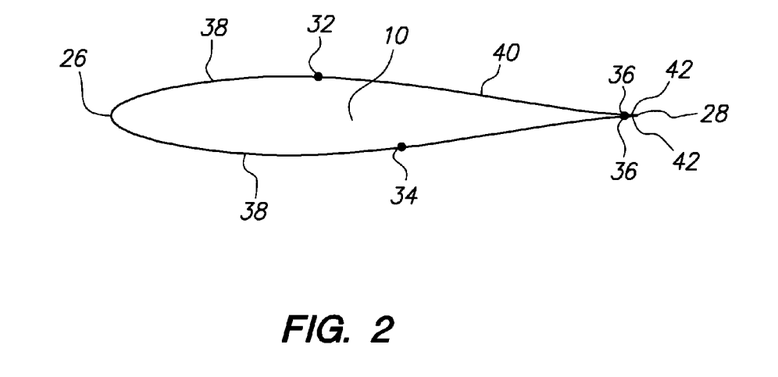
FIG. 2 is a section view of an of a foil showing general flow conditions.

FIG. 2 is a section of a foil showing general flow conditions, being a representative arrangement of the boundary layer development of an arbitrary foil. it shows, qualitatively, the general location of the upper boundary layer transition point 32, lower boundary layer transition point 34, separation point 36, a laminar boundary layer region 38, turbulent boundary layer region 40, and separated flow region 42. These flow conditions are highly dependent on the foil, and Reynolds Number of a foil moving relative to a fluid. The exact location of vortex generators applied to any structure require a determination of the conditions of the boundary layer for the desired operating condition. In general however, it is noted that a vortex generator in the laminar boundary layer will have relatively high drag for a given height, due to the thin nature of the boundary layer. in this location, sub boundary layer vortex generators 24 are desirable from a drag outcome, but the mechanical constraints of fabrication may require a minimum height to be accepted. The vortex generator is usually located towards the rear of the extent of laminar flow for the condition that the application is desired. A Gurney Flap 56, Lift Enhancing Tab, or Divergent Trailing Edge transverse vortex generator exists in an area of thickened turbulent boundary layer.

Figure 3:
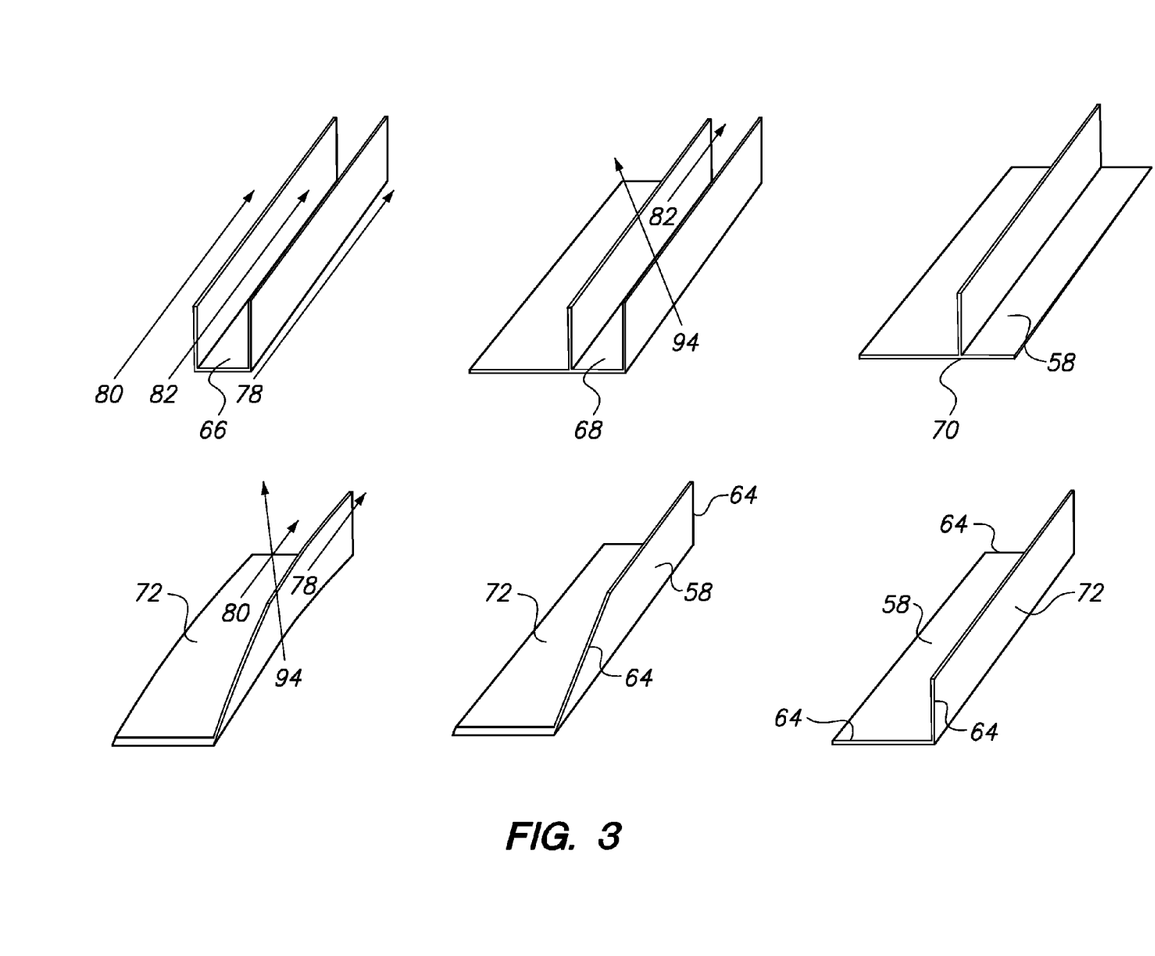
FIG. 3 is a top perspective view of an alternative blade form elastomeric extrusions, and vertical trimming.

FIG. 3 is a top perspective of alternative blade form elastomeric extrusions, and vertical trimming representation of alternative arrangements for elastomeric blade vortex generators. Upper left to right are a U form double blade 66, F form vortex generator 68, single blade extrusion 70, with a series of L form extrusion 72 sections below, showing different trim line 64 configurations. A representation of streamwise flow 94 is shown with approximate locations of vortex development shown.

Figure 4:
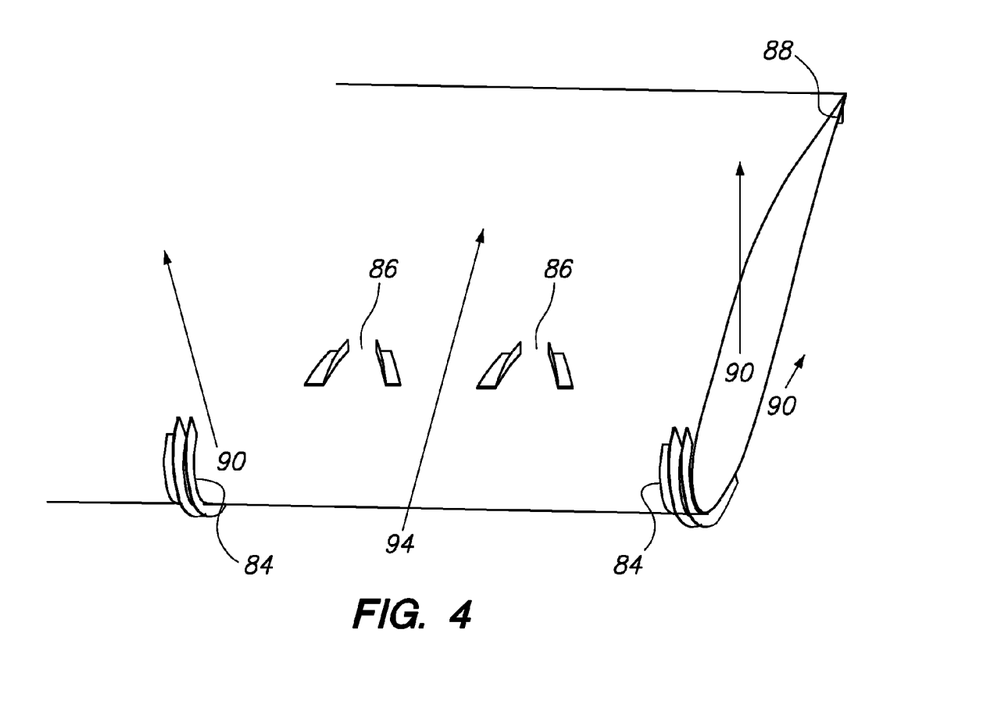
FIG. 4 is a top perspective view of a representative application of conformal elastomeric blade vortex generators to an aerodynamic surface.

FIG. 4 is a top perspective view of representative application of conformal elastomeric blade vortex generators to an aerodynamic surface.

Figure 5:
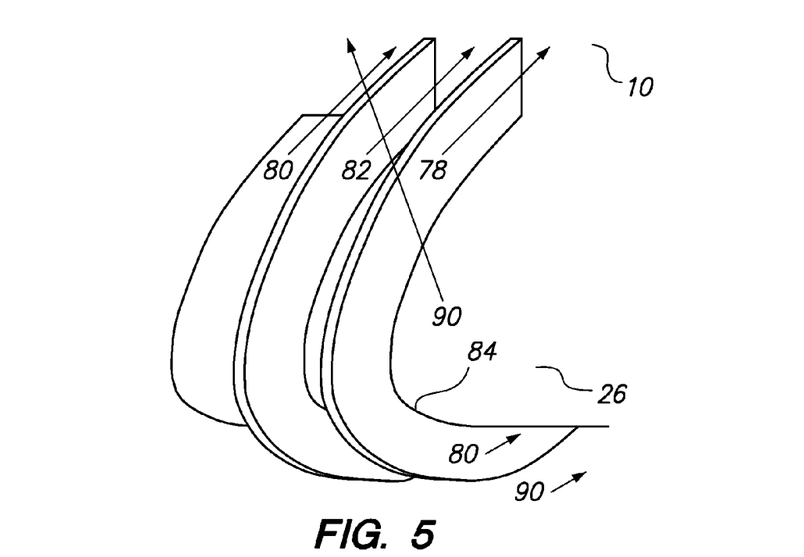
FIG. 5 is a front perspective view of an elastomeric vortex generator applied around the radius of a leading edge.

FIG. 5 is a front perspective view of detail of an elastomeric vortex generator applied around the radius of a leading edge.

Figure 6:
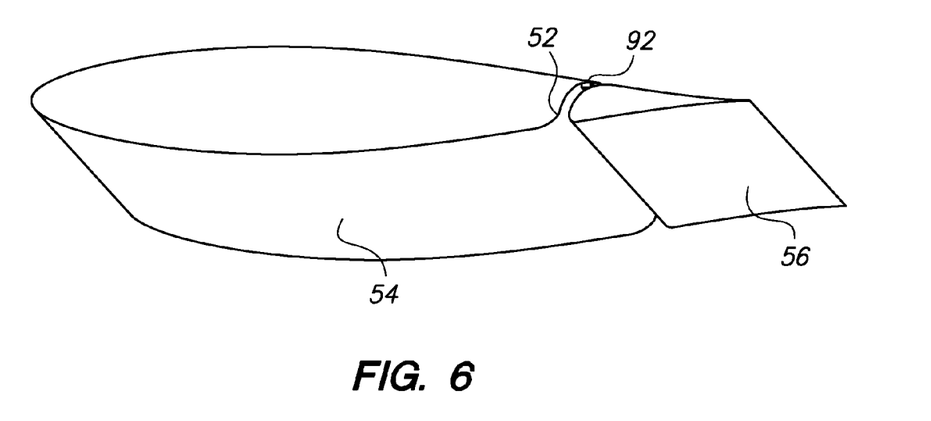
FIG. 6 is a bottom perspective view of a 2 element wing and flap system, with an extruded elastomeric vortex generator fitted in the flap cove.

FIG. 6 is a bottom perspective view of a 2 element wing and flap 56 system, with an extruded elastomeric vortex generator fitted in the flap cove 52.

Figure 7:
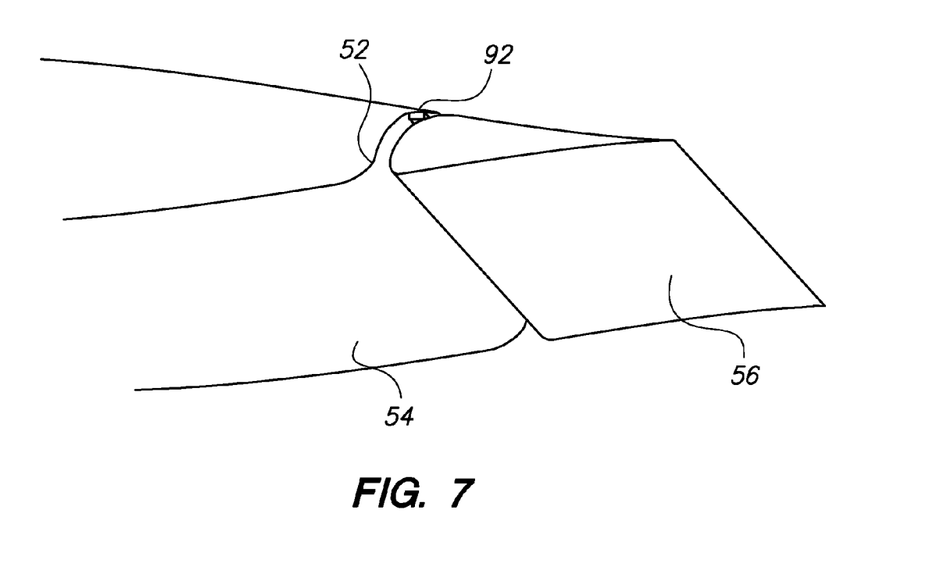
FIG. 7 is a bottom detail view of a flap cove and tab location.

FIG. 7 is bottom detail view of a flap cove 52 and tab location.

Figure 8:
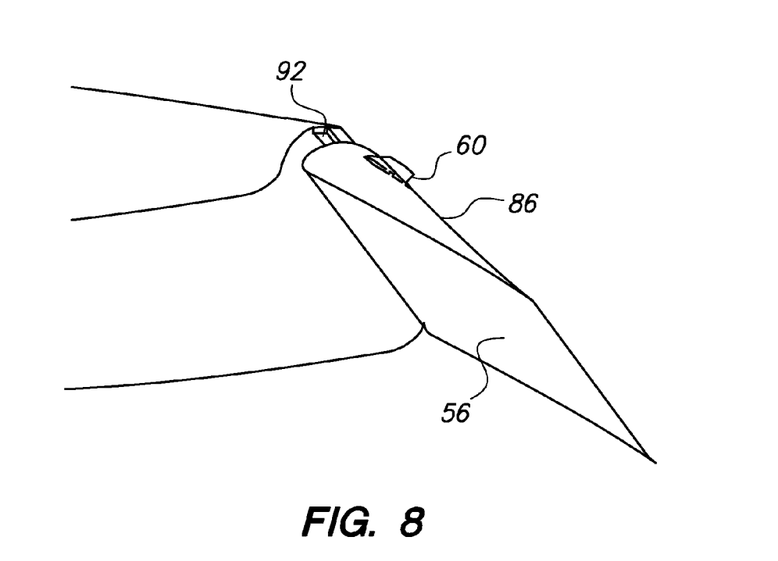
FIG. 8 is a bottom detail view of a deflected flap showing the location of an extruded elastomeric cove tab, and a representation of a blade vortex generator mounted on the upper forward chord of the flap element.

FIG. 8 is a bottom detail view of deflected flap 56 showing the location of an extruded elastomeric cove tab 92, and a representation of a blade vortex generator mounted on the upper forward chord of the flap 56 element.

Figure 9:
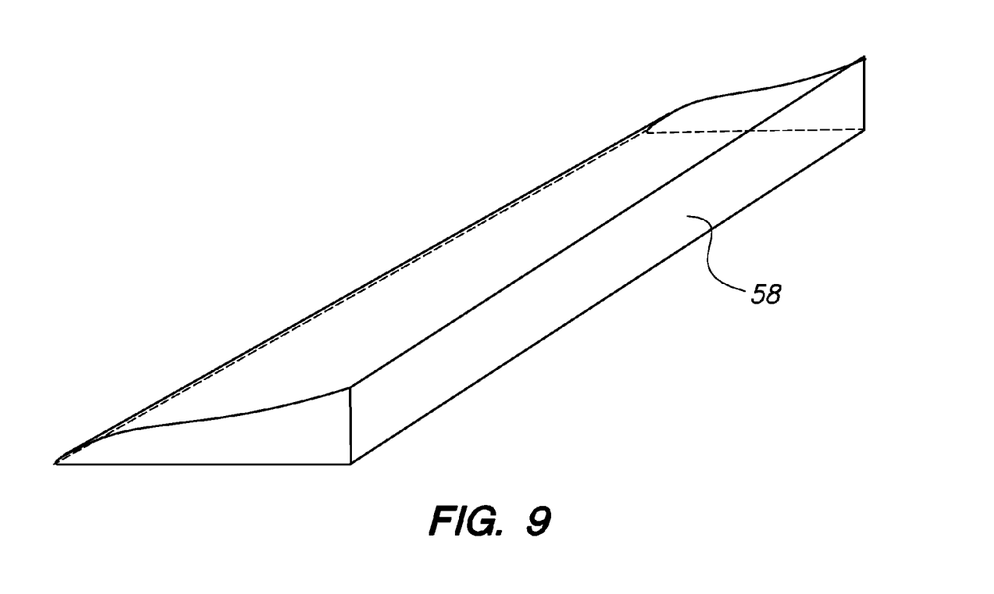
FIG. 9 is a top perspective view of an extrusion of ogival elastomeric vortex generator stock.

FIG. 9 is a top perspective view of extrusion of ogival elastomeric vortex generator stock. This is manufactured from an EPDM type material or other elastomeric compound that achieves the desired mass, wear and adhesion properties.

Figure 10:
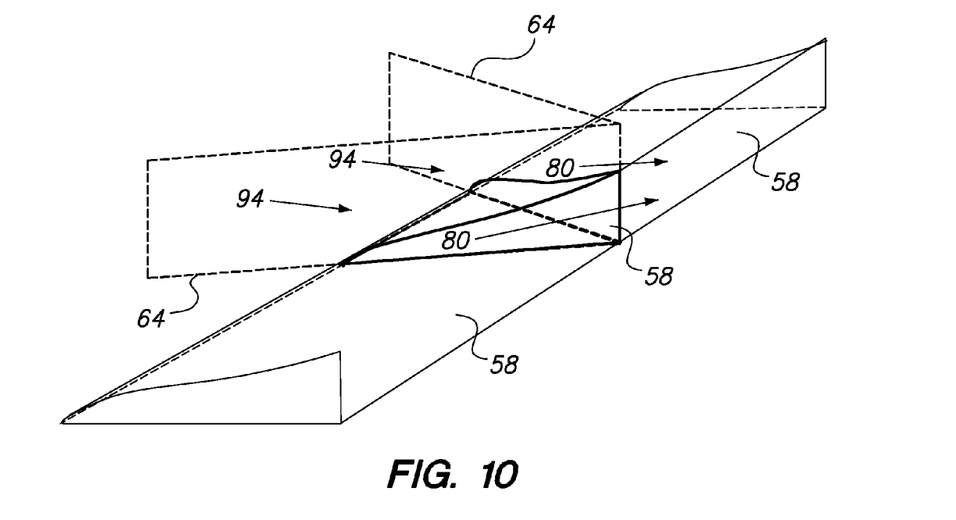
FIG. 10 is a top perspective view of an extrusion of an ogival profile elastomeric stock trimmed vertically in a v form to produce a conformal elastomeric vortex generator.

FIG. 10 is a top perspective view of an extrusion of an ogival profile elastomeric stock trimmed vertically in a V form to produce a conformal elastomeric vortex generator. The trim line 64 achieved by a rotary profile cutter, laser or water jet, results in a ramp vort4ex generator being produced. The trimmed sides may be angled as indicated, endeavoring to achieve a relative angle of the side to the freestream flow of between 15 and 25 degrees, or alternatively and more efficiently, may be planform profiled to an ogival shape consistent with a NACA inlet planform. The ramp angle is dependent on the use but data from NACA references indicate that between 4 and 8 degrees of rise from the leading edge of the ramp to the top is desirable. This profile wedge form may also be advantagely adjusted to incorporate an ogival form.

Figure 11:
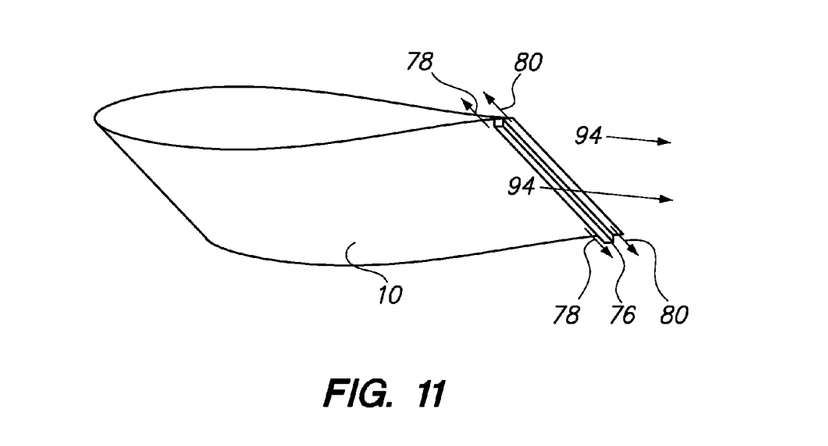
FIG. 11 is a bottom perspective view of a foil section with an elastomeric section acting as a gurney flap/lift enhancing tab/divergent trailing edge element.

FIG. 11 is a bottom perspective of a foil section with an elastomeric section acting as a Gurney Flap 56/Lift Enhancing Tab/Divergent Trailing Edge element. This is also a representative location for the employment of an L form elastomeric vortex generator applied as a Gurney Flap/Lift Enhancement Tab/Divergent Trailing Edge 88, or an inverted T form single blade extrusion 70, where the base is provided such that the trailing base element does not extend past the trailing edge. It should also be noted that the symmetrical positioning of transverse trailing edge forms such as these may be applied in special conditions, where pitching moment is excessive, or the foil is subject to both positive and negative angles of attack, such as for a rudder or aileron system. In such a case, the mass will naturally be greater, however the effect is generally to shift the lift coefficient correlation to angle of attack to a higher angle per degree of angle of attack.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. An application of passive, flexibly attached geometry, elastomeric vortex generators lift enhancement tabs for improving flow on a foil or series of foils, thereby improving lift, drag, angle of attack capability or lift to drag ratios, comprising:

passive means for providing an element for forming transverse vortices, and a base surface for attachment to a foil or aero/hydrodynamic surface, wherein said passive means for providing an element for forming said transverse vortices is elastomeric and is configured to be bonded to the foil or aero/hydrodynamic surface, said passive means further comprising a front surface configured at an angle normal to a free stream aero/hydrodynamic flow to generate a first vortex, and a rear surface configured at an angle normal to said free stream aero/hydrodynamic flow to generate a second vortex, whereby said passive means body is configured for force balance between said first and second vortex forces so as to provide minimum force loading on said base surface, and said first and second vortices are configured to reenergize a downstream boundary layer, improving lift, drag, angle of attack capability or lift to drag ratios.

2. The application of passive, flexibly attached geometry, elastomeric vortex generators in accordance with claim 1, wherein said passive means for providing an element for forming vortices is configured to be bonded directly on to a surface of the foil or aero/hydrodynamic surface to improve flow on a foil or series of foils, thereby improving lift, drag, angle of attack capability or lift to drag ratios.

3. An application of passive, flexibly attached geometry, elastomeric vortex generators in accordance with claim 2 for improving flow on a foil or series of foils, thereby improving lift, drag, angle of attack capability or lift to drag ratios, comprising:

a passive, bondable, conformal elastomeric extrusion or section, for providing an element for forming vortices, and a base surface for attachment to foil or aero/hydrodynamic surface.

4. The application of passive, flexibly attached geometry, elastomeric vortex generators as recited in claim 3, further comprising:

a profile in a U form, or alternatively an F profile, or alternatively an inverted T profile, or alternatively an L profile mounted at an angle to the free stream flow of between 15 and 25 degrees, located on the surface of the section within 20% of the chord of the wing, flap or surface applied thereon elastomeric blade vortex generator, for developing vortices to re-energise the boundary layer, or to adjust existing flow to improve lift, drag or lift/drag ratios.

5. The application of passive, flexibly attached geometry, elastomeric vortex generators lift enhancement tabs as recited in claim 1, further comprising:

an aligned transversely to free stream, parallel to trailing edge, positioned on the lower (high pressure) surface, between 0 and 2 times the height of the tab forward of the trailing edge of the wing, or flap, or flap cove, of a height of less than 2% of chord, bondable, conformable, extrusion section of a box, rectangle, or ramp elastomeric gurney tab, for generating an off body recirculation field that then jets the upper flow from the main wing down the face of the flap, reattaching flow on the flap and increasing total lift and reducing drag, resulting in increased aft aerodynamic loading, a reduction in leading edge suction, and reduced adverse pressure gradient development thereby increasing total lift, and reducing drag at low speeds, and increasing the critical Mach number/drag divergence Mach of the foil.

6. The application of passive, flexibly attached geometry, elastomeric vortex generators as recited in claim 1, further comprising:

a conformal, bondable U form or F form double blade vortex generator, for efficiently developing vortices.

7. The application of passive, flexibly attached geometry, elastomeric vortex generators as recited in claim 1, further comprising:

a conformal, bondable F form double blade vortex generator, for efficiently developing vortices, rotated anti clockwise such that the bonding surface is the vertical stroke of the F shape, for efficiently developing vortices and developing a trapped vortex between the twin blades thus formed arising normal to the substrate surface and aligned with the extruded axis between 15 and 25 degrees from the free stream flow.

8. The application of passive, flexibly attached geometry, elastomeric vortex generators as recited claim 1, further comprising:

a low profile wedge or ogival section, or F, T or U ogival section, or F, inverted T or U section extrusion, bondable, elastomeric, aligned with aft face at, or forward by not more than 2 times the tab height from the lower trailing edge of the foil section, acts as low tab height lift enhancement tab at low velocities elastomeric divergent trailing edge-lift tab for developing a transverse vortex proximate to the trailing edge which induces an increase in the wake exit angle and local velocity at the upper trailing edge, resulting in increased aft aerodynamic loading and reduction in leading edge suction, thereby reducing upper surface velocities while maintaining total lift, and therefore reducing drag and increasing the critical mach number of the foil resulting in increased aft aerodynamic loading, a reduction in leading edge suction, and reduced adverse pressure gradient development thereby increasing total lift, and reducing drag at low speeds, and increasing the critical Mach number/drag divergence Mach of the foil.

9. The application of passive, flexibly attached geometry, elastomeric lift enhancement tabs vortex generators as recited in claim 1, further comprising:
an elastomeric section aligned transversely to free stream, parallel to trailing edge, constant span wise height from substrate, positioned on the lower (high pressure) surface, between 0 and 2 times the height of the tab forward of the trailing edge of the wing, or flap, or flap cove, of a height of less than 2% of chord, bondable, conformable, extrusion section of a box, rectangle, or ramp elastomeric gurney tab, for generating an off body recirculation field that then jets the upper flow from the main wing down the face of the flap, reattaching flow on the flap and increasing total lift and reducing drag generating an transverse vortex proximate to the trailing edge which induces an increase in the wake exit angle and local velocity at the upper trailing edge, resulting in increased aft aerodynamic loading, a reduction in leading edge suction, and reduced adverse pressure gradient development thereby increasing total lift, and reducing drag at low speeds, and increasing the critical Mach number/drag divergence Mach of the foil.

10. The application of passive, flexibly attached elastomeric vortex generators as recited in claim 4, further comprising:
a low profile wedge or ogival section, or F or U section extrusion or ogival section, or F, inverted T or U section extrusion, bondable, elastomeric, aligned with aft face at, or forward by not more than 2 times the tab height from the lower trailing edge of the foil section, acts as low tab height lift enhancement tab at low velocities elastomeric divergent trailing edge-lift tab for developing a transverse vortex proximate to the trailing edge which induces an increase in the wake exit angle and local velocity at the upper trailing edge, resulting in increased aft aerodynamic loading and reduction in leading edge suction, thereby reducing upper surface velocities while maintaining total lift, and therefore reducing drag and increasing the critical mach number of the foil resulting in increased aft aerodynamic loading, a reduction in leading edge suction, and reduced adverse pressure gradient development thereby increasing total lift, and reducing drag at low speeds, and increasing the critical Mach number/drag divergence Mach of the foil.

11. The application of passive, flexibly attached geometry, elastomeric vortex generators lift enhancement tabs as recited in claim 1, further comprising:
a low profile wedge or ogival section, or F, T or U section extrusion ogive section, or F, inverted T or U section extrusion, bondable, elastomeric, aligned with aft face at, or forward by not more than 2 times the tab height from the lower trailing edge of the foil section, acts as low tab height lift enhancement tab at low velocities elastomeric divergent trailing edge-lift tab for developing a transverse vortex proximate to the trailing edge which induces an increase in the wake exit angle and local velocity at the upper trailing edge, resulting in increased aft aerodynamic loading and reduction in leading edge suction, thereby reducing upper surface velocities while maintaining total lift, and therefore reducing drag and increasing the critical mach number of the foil resulting in increased aft aerodynamic loading, a reduction in leading edge suction, and reduced adverse pressure gradient development thereby increasing total lift, and reducing drag at low speeds, and increasing the critical Mach number/drag divergence Mach of the foil.

12. The application of passive, flexibly attached geometry, elastomeric vortex generators as recited in claim 6, further comprising:
a low profile wedge or ogival section, or F or U section extrusion, box, rectangle, F, inverted T or U or folding section extrusion, bondable, elastomeric, aligned with aft face at, or forward by not more than 2 times the tab height from the lower trailing edge of the wing-flap or flap-flap cove section, acts as low tab height lift enhancement tab at low velocities elastomeric divergent trailing edge-lift tab, for developing a transverse vortex proximate to the trailing edge which induces an increase in the wake exit angle and local velocity at the upper trailing edge, resulting in increased aft aerodynamic loading and a reduction in leading edge suction, thereby reducing upper surface velocities while maintaining total lift, and therefore reducing drag and increasing the critical mach number of the foil resulting in the development of a transverse vortex proximate to the lower trailing edge of the forward element that thereby results in jetting of the flow off the trailing edge of said element such as to cause an off-body recirculation field to be established above the trailing element of the series, and therefore resulting in a surface jetting over the trailing element below the off body recirculation field, reducing separation at high flap deflections, increasing lift, and reducing drag.

13. The application of passive, flexibly attached geometry, elastomeric vortex generator as recited in claim 5, further comprising:
a low profile wedge or ogival section, or F, T or U section extrusion, bondable, elastomeric, aligned with aft face at, or forward by not more than 2 times the tab height from the lower trailing edge of the foil section, acts as low tab height lift enhancement tab at low velocities elastomeric divergent trailing edge-lift tab for developing a transverse vortex proximate to the trailing edge which induces an increase in the wake exit angle and local velocity at the upper trailing edge, resulting in increased aft aerodynamic loading and reduction in leading edge suction, thereby reducing upper surface velocities while maintaining total lift, and therefore reducing drag and increasing the critical mach number of the foil a low profile square, rectangular or wedge, or F, inverted T or U section extrusion, bondable, elastomeric, aligned with aft face at, or forward by not more than 2 times the tab height from the lower trailing edge of the foil section, acts as low tab height lift enhancement tab at low velocities and as a elastomeric divergent trailing edge-tab at high Mach, low angle of attack conditions, for developing a transverse vortex proximate to the trailing edge which induces an increase in the wake exit angle and local velocity at the upper trailing edge, resulting in increased aft aerodynamic loading, a reduction in leading edge suction, and reduced adverse pressure gradient development thereby increasing total lift, and reducing drag at low speeds, and increasing the critical Mach number/drag divergence Mach of the foil.

14. The application of passive, flexibly attached geometry, elastomeric vortex generators as recited in claim 6, further comprising:

a conformal, bondable U or F form double blade that results in a trapped vortices, for efficiently developing vortices, and maintaining a stable generator structure.

15. The application of passive, flexibly attached elastomeric vortex generators as recited in claim 10, further comprising:
a conformal, bondable f form U or F form double blade that results in a trapped vortices, for efficiently developing vortices, and maintaining a stable generator structure.

16. The application of passive, flexibly attached elastomeric vortex generators as recited in claim 10, further comprising:
a low profile wedge or ogival section, or F, T or U section extrusion or ogive section, or F, inverted T or U section extrusion, bondable, elastomeric, aligned with aft face at, or forward by not more than 2 times the tab height from the lower trailing edge of the foil section, acts as low tab height lift enhancement tab at low velocities elastomeric divergent trailing edge-lift tab for developing a transverse vortex proximate to the trailing edge which induces an increase in the wake exit angle and local velocity at the upper trailing edge, resulting in increased aft aerodynamic loading and reduction in leading edge suction, thereby reducing upper surface velocities while maintaining total lift, and therefore reducing drag and increasing the critical mach number of the foil thereby increasing total lift, and reducing drag at low speeds, and increasing the critical Mach number/drag divergence Mach of the foil.

17. An elastomeric vortex generator comprising:
an elastomeric extrusion or section, for providing an element for forming vortices, and a base surface for attachment to foil or aero/hydrodynamic surface, wherein although flexible, said elastomeric extrusion or section is configured to retain its shape at high fluid flow velocities over said foil or aero/hydrodynamic surface.

18. The elastomeric vortex generator of claim 17 wherein the shape of the elastomeric extrusion or section is retained by vortices generated by elastomeric extrusion or section, the vortices being generated on either side of the elastomeric extrusion or section.

19. The application of passive, flexibly attached geometry, elastomeric lift enhancement tabs vortex generators as recited in claim 1, wherein the passive means causes no increase in radar cross section change to the substrate or underlying body.

20. An application of elastomeric, passive, flexibly attached geometry, lift enhancement tabs for improving flow on a foil, comprising: a bondable, conformal elastomeric extrusion or section of square, or rectangular, or U, or F or inverted T section, aligned transversely to free stream, parallel to trailing edge, positioned on the lower (high pressure) surface, between 2 and zero times the height of the tab forward of the trailing edge of the wing, or flap, or flap cove, of a height of less than 2% of chord, that acts at high Mach number as a divergent trailing edge tab, for developing a transverse vortex proximate to the trailing edge which induces an increase in the wake exit angle and local velocity at the upper trailing edge, resulting in increased aft aerodynamic loading, a reduction in leading edge suction, and delayed adverse pressure gradient development thereby delaying the development of a normal shock wave at high subsonic Mach, and increasing the critical Mach number/drag divergence Mach of the foil at high Mach, or reducing wave drag for a given Mach number.

21. The application of elastomeric, passive, fixedly attached geometry, lift enhancement tabs wherein the divergent trailing edge tabs as recited in claim 20, further comprising:
a conformal, bondable U or F form double blade that results in a trapped vortices, for efficiently developing vortices, and maintaining a stable generator structure.

22. The application of elastomeric, passive, fixedly attached geometry, lift enhancement tabs wherein the divergent trailing edge tabs as recited in claim 20 has no increase in radar cross section change to the substrate or underlying body.

* * * * *